Patented Feb. 6, 1951

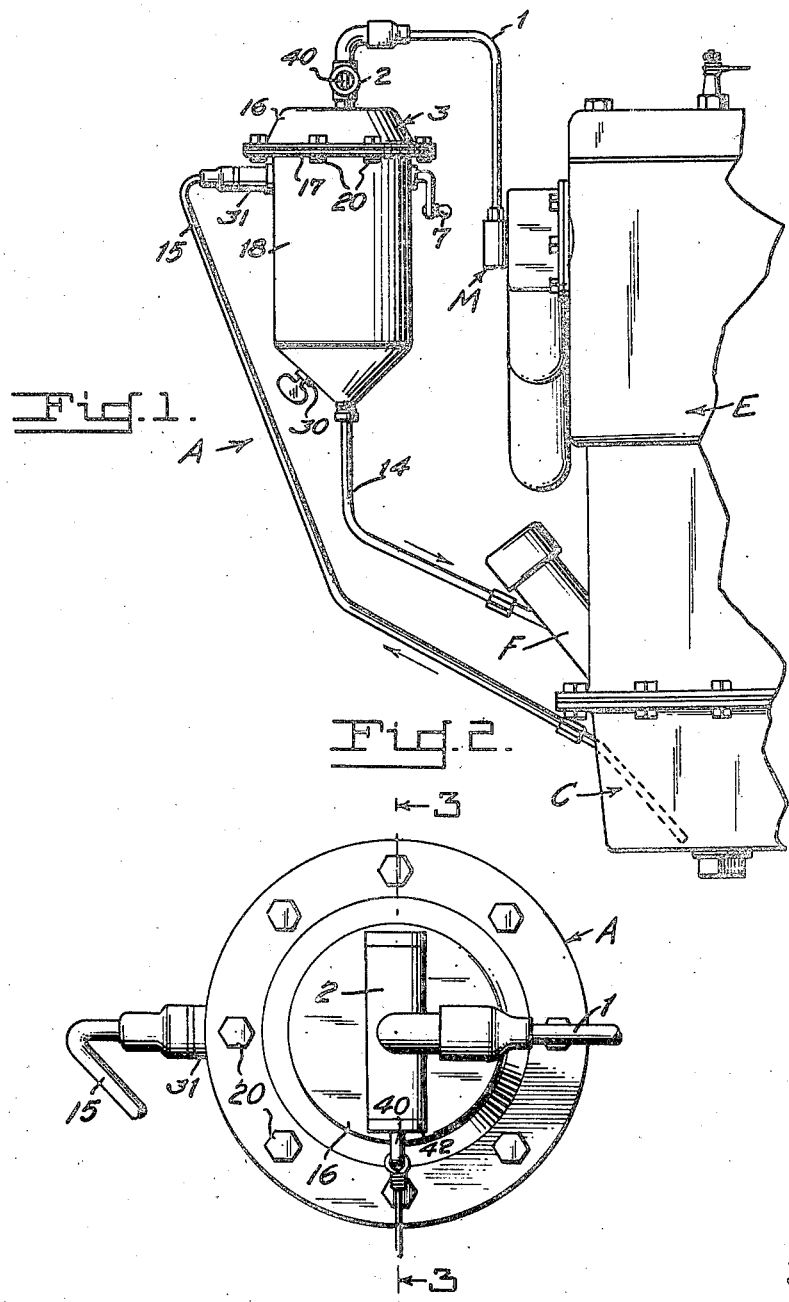

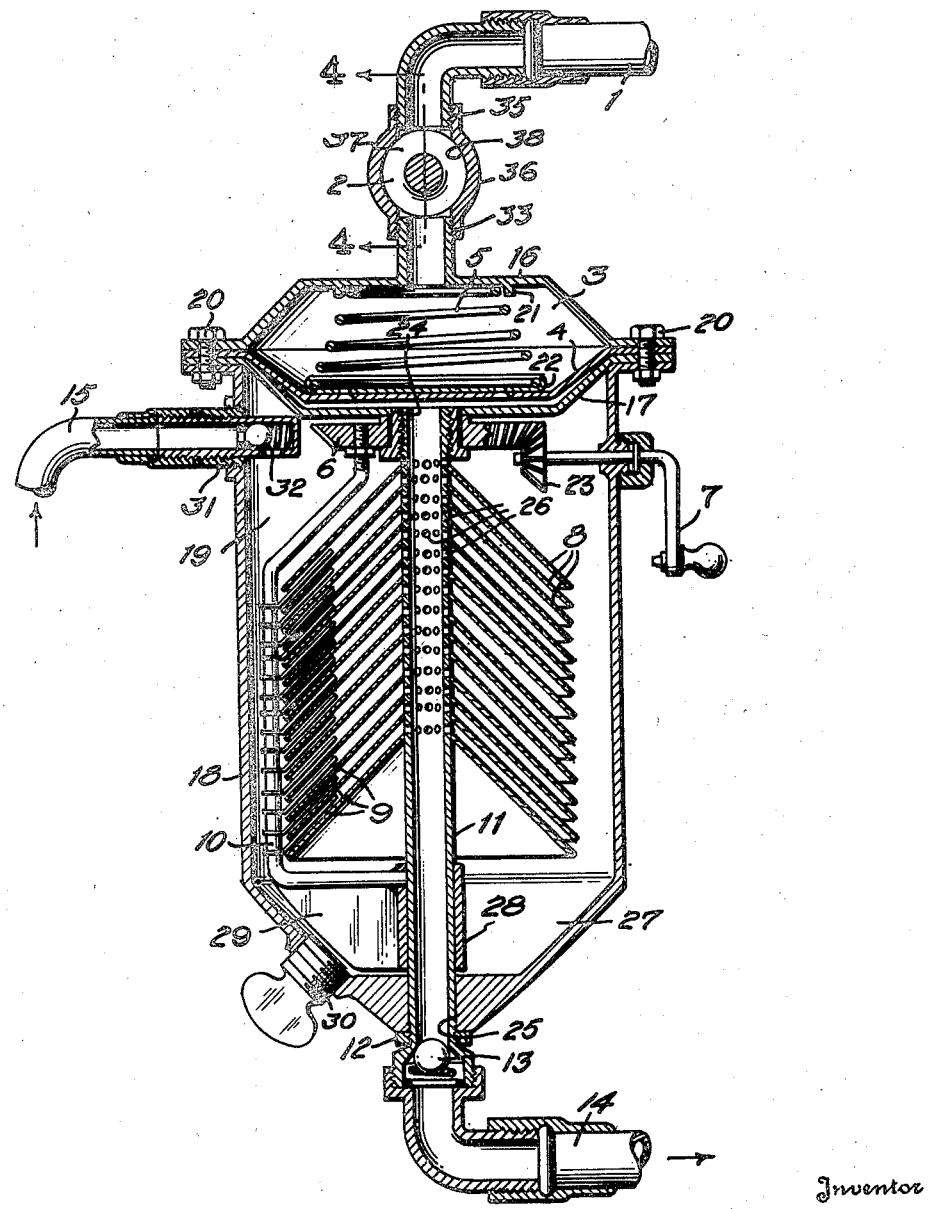

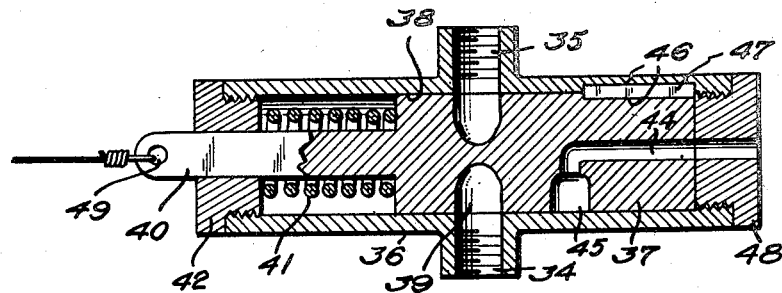
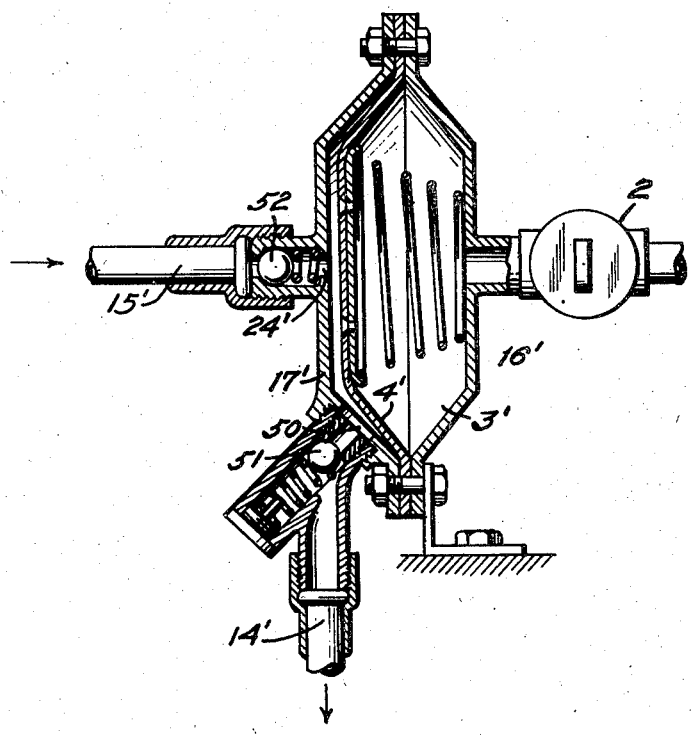

2,540,134

UNITED STATES PATENT OFFICE 2,540,134

OIL FILTERING APPARATUS

Helmer S. Nelson, Chicago, Ill.

Application November 12, 1946, Serial No. 709,109

5 Claims. (Cl. 210—167)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to oil filtering apparatus for use with internal combustion engines, and particularly to oil filtering apparatus for use with internal combustion engines such as those of the motor vehicle type, whereby the lubricating oil is filtered and impurities are removed therefrom during operation of such an engine.

In the operation of an internal combustion engine, for example of the type in a motor vehicle, impurities such as water, sediment and foreign particles accumulate in the oil. There is thus presented a problem of continuously removing such impurities from the oil since it is highly desirable that only clean oil be allowed to pass through the oil pump and to the bearings. In addition such impurities in the oil tend to plug up the oil pump screen, and it is therefore further desirable to prevent or eliminate the plugging up of the oil pump screen by continuous removal of such impurities.

It is accordingly an object of this invention broadly to provide an improved oil filtering apparatus for use with an internal combustion engine whereby, through fluctuating of vacuum in the intake manifold of the engine, oil from the bottom portion of the crankcase or oil pan is continuously, efficiently and effectively filtered through an independent oil circuit during operation of the engine to remove impurities such as water, sediment and foreign particles.

More specifically it is an object of this invention to provide such an improved oil filtering apparatus having the above qualities by combining a vacuum chamber adapted to be connected through an opening therein to the intake manifold of the engine and defined in part by one side of a spring backed diaphragm, and a filtering chamber in communication with the other side of said diaphragm and containing disc filtering elements, whereby, through vacuum conditions in the intake manifold, oil from the crankcase or oil pan of the engine is caused to be filtered through said filtering chamber in an automatic continuously pulsating flow during operation of the engine, and the clean filtered oil from the filtering chamber is automatically returned under positive pressure in a continuously pulsating flow in part to the crankcase and in part to the filtering chamber, the latter to provide generally self-cleaning of the filtering discs.

It is a further object of this invention to provide an improved, effective, efficient and generally self-cleaning oil filtering apparatus which automatically and continuously filters and cleans the oil of an internal combustion engine during its operation, which apparatus is further provided with manually operated means for removing accumulated impurities such as water and sediment on first starting the engine after a prolonged stop, and which apparatus is further provided with manually operated cleaning means for occasional necessary quick cleaning without disconnecting or removing the apparatus from the engine.

These objects are attained by the oil filtering apparatus illustrated by way of example in the accompanying drawing in which:

Figure 1 is a side elevational view of my improved oil filtering apparatus connected to an engine.

Figure 2 is a plan view of the apparatus.

Figure 3 is a side view in vertical section of the apparatus on a plane indicated by the line 3—3 of Figure 2.

Figure 4 is a fragmentary view in section showing in detail the manual control valve of my apparatus on a plane indicated by the line 4—4 of Figure 3.

Figure 5 is a sectional view of a modification of the vacuum chamber of my apparatus.

As illustrated in Figure 1, my improved oil filtering apparatus generally designated as A is connected to the engine, generally designated as E, at the intake manifold M, at the lower portion of the crankcase or oil pan C, and at the oil filler pipe F.

Referring now to the drawing in which similar numerals refer to similar parts throughout the several views, a flexible diaphragm 4, made of a suitable rubberlike plastic material such as neoprene, a synthetic rubberlike plastic formed by the polymerization of chloroprene, the latter being a colorless liquid $C_4H_5Cl$, made from acetyline and hydrochloric acid is disposed in a casing between flanged casing members 16 and 17 thereof, forming vacuum chamber 3 in the casing at one side of the diaphragm 4. Filter chamber 19 comprises a casing member 18 and as shown in Figure 2, casing members 16, 17 and 18, with diaphragm 4 disposed between casing members 16 and 17, are secured together as by bolts 20 in their flanges, thus forming a unitary apparatus containing vacuum chamber 3 and filter chamber 19.

A coiled compression diaphragm spring 5 in vacuum chamber 3 between casing member 16 and diaphragm 4 tends to force diaphragm 4 to a position adjacent the inner surface of casing member 17. Spring 5 is maintained in position as by means of ring projection 21 on the inner surface of casing member 16 and by plate member 22 rigidly secured to diaphragm 4. Pipe 1 leading to the intake manifold of the engine is suitably connected to vacuum chamber 3 through a manual control slide valve 2 (hereinafter more fully described) secured in a threaded opening in casing member 16 opposite diaphragm 4.

Perforated disc tube 11 extends longitudinally through filter chamber 19 and through an opening 25 in one end of casing 18, while the opposite end extends through an opening 24 in casing member 17 as shown in Figure 2, disc tube 11 being retained in position by retaining nut 12 exterior of the opening 25 in casing 18. Disposed axially on perforated disc tube 11 and secured thereto are a number of inverted cone discs 8 of metal or other suitable material closely and suitably spaced to act as filter elements, and spaced laterally from the wall of casing 18. The space between each two adjacent cone discs 8 is in fluid communication through perforations 26 with the interior of disc tube 11. Between the bottommost cone disc 8 and the lower wall of casing 18 a space 27 provides a collecting chamber for impurities such as water and sediment. Rotatably mounted on an upper portion of disc tube 11, between the uppermost disc 8 and casing member 17, is a ring gear 6. A manually operably external cleaning crank 7 is rotatable through a suitable opening and bearing in the upper wall of casing 18 and has on the interior end a pinion gear 23 meshing with ring gear 6. Secured at one end and radially inward on ring gear 6 is a rotating knife bracket 10 extending longitudinally of filter chamber 19 parallel to disc tube 11 and in the space between the outer edges of cone discs 8 and the inner wall of casing 18, knife bracket 10 being rotatably mounted at 28 on disc tube 11 at its opposite end adjacent the bottom of filter chamber 19. On the lower portion of knife bracket 10 and integral therewith is widened or web portion 29 extending to the inner wall of the bottom portion of space 27 in filter chamber 19 and from the inner side wall of space 27 to rotatable mounting 28 of knife bracket 10, said web portion 29 being designed to function as a scraper for the bottom portion of space 27. Disposed on knife bracket 10 adjacent the edges of cone discs 8 are a number of closely spaced parallel cleaning knives 9, each of knives 9 extending inward within the space between two adjacent cone discs 8 from the outer edges thereof toward disc tube 11. It will thus be seen that exterior manual operation of crank 7 causes rotating sweeping action of knives 9 within the spaces between cone discs 8, operating to remove accumulated impurities thereon, which settle to the bottom of space 27, while at the same time web portion 29 performs a sweeping action in the bottom of space 27 on accumulated impurities, water, sediment and foreign matter therein, moving the latter toward the opening of manually operable drain plug 30.

Suitably coupled to a nipple in opening 31 having at the other end an inlet check valve 32 in the upper part of casing 18 of filter chamber 19 is a pipe 15 adapted to lead to the bottom of the crankcase or oil pan, and suitably coupled to a discharge check valve 13 adjacent retaining nut 12 at the opening 25 in the bottom of casing 18 is discharge pipe 14 adapted to lead to the oil filler pipe of the crankcase. Check valves 13 and 32 are of the conventional ball and spring type and when there is a vacuum condition in filter chamber 19 oil from the oil pan or crankcase flows through pipe 15 past the ball, overcoming the spring action in inlet check valve 32, into filter chamber 19, while the ball and spring of discharge check valve 13 prevent flow of oil through discharge pipe 14. Conversely, when there is a pressure condition in filter chamber 19, inlet check valve 32 prevents outflow of oil through pipe 15, while discharge check valve 13 allows discharge of oil from filter chamber 19 to flow under pressure through pipe 14.

A simple manual slide valve 2 permits dash board control for closing vacuum pipe 1 while simultaneously allowing air to enter vacuum chamber 3. Referring to Figures 3 and 4, valve 2 is connected to casing 16 of vacuum chamber 3 and also to pipe 1 leading to the intake manifold of the engine so that passages 34 and 35 of valve 2 are in connected fluid communication respectively with vacuum chamber 3 through opening portion 33 thereof and with the engine intake manifold through pipe 1. Cylindrical valve housing 36 has a central bore 38 which extends lengthwise and which intercepts passages 34 and 35, and within bore 38 is slidable valve member 37 which has a restricted portion or circumferential groove 39 permitting passage between vacuum chamber 3 and pipe 1. Valve member 37 is provided on one end with a stem 40 extending through open screw plug 42. A spring 41 on stem 40 and in contact with plug 42 tends to force valve member 37 to the normal open position of valve 2. At the opposite end of housing 36 valve member 37 has a bore 44 leading from the opening in open screw plug 48 to port 45. Means such as grooves 46 and a key 47 may be used to prevent any possible rotation of valve member 37 about its horizontal axis. A wire may be secured at one end of stem 40 through hole 49 therein and may lead to a knob on the dash board; by pulling on the latter knob the vacuum line will be closed and air will be admitted to vacuum chamber 3.

In the operation of an internal combustion engine with my novel oil filtering apparatus attached as described, contaminated oil is drawn into the filter chamber from the bottom portion of the crankcase in an automatic continuous, pulsating flow, manually operable valve 2 being in its normal position allowing communication between the intake manifold and vacuum chamber 3. Due to the fluctuating or spasmodic vacuum conditions in the intake manifold, a quantity of oil is drawn into the filter chamber on one pulsation between adjacent cone discs 8, into perforated disc tube 11 and into the portion of the casing below vacuum chamber 3 thereof adjacent diaphragm 4, stopping momentarily, this momentary stopping or hesitation of the oil permitting impurities such as water, sediment and other foreign matter to settle toward the bottom of the filter chamber in space 27. On the next pulsation another quantity of contaminated oil is drawn into the filter chamber between the cone discs and through perforated disc tube 11 into the portion of the casing below vacuum chamber 3. Eventually diaphragm spring 5 will overcome the vacuum condition, forcing diaphragm 4 down and thereby enlarging vacuum chamber 3, which in turn forces the cleaned oil in the portion of the casing below vacuum chamber 3 out through disc tube 11 under positive pressure, part of this cleaned oil being forced back through adjacent discs to perform a cleaning action, and the remainder of the cleaned oil being forced through the length of disc tube 11 and back into the crankcase, for example by way of the filler pipe. Due to the short duration of vacuum, the discharge line must be large enough to allow the cleaned oil to be expelled from the filter chamber rapidly. Water, sediment and foreign matter accumulated in the bottom of the filter chamber in space 27 is occasionally removed through manually operable drain plug 30. By observation of the flow of cleaned oil into the filler pipe, operation inspection is easily made. Occasional necessary manual cleaning is easily accomplished without removal of the apparatus merely by manual operation of cleaning crank 7 and removal of drain plug 30.

After an internal combustion engine, such as in a motor vehicle, has not been operated for a period of time and also during changeable weather conditions, condensation will form in the bottom of the crankcase or oil pan. This condensation may be immediately removed by the operator on starting the engine by operation of manual valve 2, which may be done by pulling on a dash board knob connected thereto. Pulling such a knob will close the vacuum line, admitting air into the vacuum chamber and forcing the diaphragm under spring action to expel the oil in the casing. On pushing the knob back to its original position manual valve 2 again permits vacuum in the intake manifold to act on the diaphragm, drawing contaminated oil again into the filter chamber. With so few as a half dozen strokes condensation may thus be removed immediately on starting the engine, and may be drained through drain plug 30.

My novel oil filtering apparatus has many advantages over filters heretofore used. Moisture causes sludge in oil when agitated, and through my novel apparatus moisture as well as other foreign matter may be removed from the bottom of the crankcase or oil pan prior to excessive agitation and in a superior manner due to the spasmodic or pulsating action of the filter permitting time for the separation and settling of the water and other foreign matter to the bottom of the filter chamber. Under extreme operating conditions, such as in a vehicle climbing hills and travelling over rough terrain when it is necessary to do an excessive amount of gear shifting and the engine becomes heated above normal temperature, under substantially constant operation due to fluctuating of vacuum, my improved oil filtering apparatus will filter many times the normal amount of contaminated oil, from the bottom of the crankcase, which is then returned clean and cool to the crankcase to be picked up by the oil pump and circulated to all bearing surfaces. My improved oil filtering apparatus can be operated manually at will immediately after the engine is started and while the engine is idling, to remove dirt and water which has settled to the bottom of the oil pan after a prolonged stop. My disclosed apparatus is easy to install on most equipment, is highly efficient and may be cleaned manually without removal from the engine.

In Figure 5 is shown a modification of the casing with vacuum chamber 3, the latter being designated as 3'. The casing with vacuum chamber 3' is similar in structure to the casing with vacuum chamber 3 above described and shown in Figure 3, except that in the casing an inlet opening 24' opposite one side of diaphragm 4' is provided with an inlet check valve 52 in casing member 17' and having external threads thereon for a pipe connection to the outlet side of any suitable oil filtering device. In addition, an outlet opening 50 is provided in casing member 17 opposite the same side of diaphragm 4' as inlet opening 24', outlet opening 50 being provided with an outlet check valve 51 adapted for a pipe 14' connection to the oil filler pipe of the crankcase of the engine. This modified casing with vacuum chamber as one aspect of my invention may be utilized in connection with any suitable oil filter having an inlet connection with the bottom portion of the crankcase or oil pan and having an outlet connection by means of pipe 15' to the casing as shown. While this particular aspect of my invention does not permit the self-cleaning and manual cleaning characteristics of my complete apparatus above described, contaminated oil is automatically continuously, efficiently and effectively filtered through an independent circuit in a pulsating flow due to fluctuating vacuum conditions in the intake manifold, and the filtered clean oil is automatically and continuously returned under positive pressure by action of diaphragm 4' through pipe 14' to the oil filler pipe and thus to the crankcase of the engine.

While I have described and shown certain specific details of my invention, it is to be understood that it is capable of modification and that changes may be made without departing from the spirit and scope of my invention as set forth in the following claims.

What I claim is:

1. An automatic generally self-cleaning oil filtering apparatus including manually operable cleaning means therefor for automatic filtering of oil for an internal combustion engine during the operation thereof, comprising a casing, a diaphragm within and extending across the interior of said casing, said diaphragm providing on one side thereof a vacuum chamber, pipe means for connecting said vacuum chamber through an opening therein, opposite said one side of said diaphragm to the intake manifold of said engine, a manual control valve for controlling flow through said opening, a spring in said vacuum chamber urging said diaphragm in a direction to enlarge said vacuum chamber, a filtering chamber in fluid communication with said casing through an opening therein opposite the other side of said diaphragm, an outlet in said filter chamber, spaced oil filter elements in said filter chamber, a perforated tube in said filter chamber connecting said oil outlet therein to said opening and extending through said spaced filtering elements, said perforated tube having perforations therein providing fluid communication between the interior of said perforated tube and the spaces between said spaced filtering elements, manually operable cleaning elements extending between said spaced oil filter elements for cleaning the latter without opening or detaching said filter chamber, a drain plug in said filter chamber, an oil inlet in said filter chamber, an inlet check valve and an outlet check valve for said oil inlet and oil outlet, respectively, and pipes for connecting said oil inlet and outlet of said filter chamber through their said respective check valves to the bottom and relative upper portions of the crankcase of said engine.

2. An automatic generally self-cleaning oil filtering apparatus including manually operable cleaning means therefor for automatic filtering of oil for an internal combustion engine during the operation thereof, comprising a casing having opposite walls, a diaphragm within and extending across said casing between said walls, said diaphragm providing at one side thereof a vacuum chamber, a spring in said vacuum chamber extending from one of said walls to one side of said diaphragm for resiliently urging said diaphragm toward the opposite wall of said casing, an opening in said one wall of said casing for connecting said vacuum chamber to the intake manifold of said engine, a filter chamber in fluid communication with said casing through an opening therein in said oposite wall thereof, a perforated tube in said filter chamber extending upwardly at one end through said opening in said opposite wall of said casing and establishing said fluid communication therewith, said perforated tube extending at the other end to an oil outlet opening in the bottom of said filter chamber, axially spaced disc filter elements on said tube in said filter chamber, the space between each two adjacent filter elements being in fluid communication with the interior of said tube through perforations therein, a rotatable bracket in said filter chamber in the space between the wall thereof and the edges of said disc filter elements, spaced cleaning knives on said bracket, each of said knives extending within said space between two adjacent filter elements, a crank extending exterior of said filter chamber and geared to said rotatable bracket for manual rotation thereof and of the cleaning knives carried thereby, a drain plug in the bottom of said filter chamber, an oil inlet opening in said filter chamber, an inlet check valve in said oil inlet opening, an outlet check valve on said oil outlet opening in the bottom of said filter chamber, and means for connecting said filter chamber through said inlet and outlet openings and their respective check valves to the bottom and relative upper portions of the crankcase of said engine.

3. The oil filtering apparatus as set forth in claim 2, wherein a manual control valve is disposed between said opening in one wall of said vacuum chamber and the connection to the intake manifold of said engine, for manual control of the vacuum and the admission of air to said vacuum chamber.

4. The oil filtering apparatus as set forth in claim 2, wherein said disc filter elements in said filter chamber are inverted cone discs.

5. An automatic generally self-cleaning oil filtering apparatus for automatic filtering of oil for an internal combustion engine during the operation thereof, comprising a casing having opposite walls, a diaphragm within and extending across said casing between said walls, said diaphragm providing at one side thereof a vacuum chamber, a spring in said vacuum chamber extending from one of said walls to said one side of said diaphragm for resiliently urging said diaphragm toward the opposite wall of said casing, an opening in said one of said walls of said casing for connecting said vacuum chamber in fluid communication with the intake manifold of said engine, a filter chamber secured to and in fluid communication with said casing through an opening therein in said opposite wall thereof, a perforated tube in said filter chamber extending upwardly at one end thereof to said opening in said opposite wall of said casing and establishing said fluid communication therewith, said perforated tube extending at the other end thereof to an oil outlet opening in the bottom of said filter chamber, axially spaced disc filter elements on said perforated tube in said filter chamber, the space between each two adjacent ones of said spaced filter elements being in fluid communication with the interior of said perforated tube through perforations therein, a drain plug in the bottom of said filter chamber, an oil inlet opening in said filter chamber, an inlet check valve in said oil inlet opening, an outlet check valve in said oil outlet opening, and means for connecting said filter chamber through said inlet and outlet openings and their respective check valves to the bottom and relative upper portions, respectively, of the crankcase of said engine.

HELMER S. NELSON.

REFERENCES CITED

The following references are of record ni the file of this patent:

UNITED STATES PATENTS

| Number | Name | Date |
|---|---|---|
| 1,608,571 | Watson | Nov. 30, 1926 |
| 1,767,675 | Howarth | June 24, 1930 |
| 1,926,741 | Frye | Sept. 12, 1933 |
| 2,079,858 | Horton | May 11, 1937 |

FOREIGN PATENTS

| Number | Country | Date |
|---|---|---|
| 656,008 | France | Dec. 24, 1928 |